United States Patent [19]
Hoover

[11] 3,958,092
[45] May 18, 1976

[54] APPARATUS FOR DISCRIMINATING BETWEEN LIQUID AND GASEOUS FLOW
[76] Inventor: Jimmie N. Hoover, 4609 Dakota, Odessa, Tex. 79762
[22] Filed: Jan. 27, 1975
[21] Appl. No.: 544,221

[52] U.S. Cl.................... 200/81.9 M; 200/83 L; 137/183; 340/240
[51] Int. Cl.²........................................ H01H 35/24
[58] Field of Search................... 340/238, 240, 244; 73/239, 249, 271, 406; 417/43, 44; 137/171, 173, 176, 183; 200/83 L, 81.9 M

[56] References Cited
UNITED STATES PATENTS

| | | | |
|---|---|---|---|
| 3,297,843 | 1/1967 | Hoss | 200/81.9 M |
| 3,551,071 | 12/1970 | Hoover | 137/183 |
| 3,551,620 | 12/1970 | Hoover | 200/83 L |

*Primary Examiner*—Gerald P. Tolin
*Attorney, Agent, or Firm*—Marcus L. Bates

[57] ABSTRACT

A flow responsive apparatus having a movable element therein ported and connected to a manifold and tube assembly so that during liquid flow conditions, a liquid head is developed in both the manifold and the tube assembly which lifts the valve element in an upward direction, with the resultant movement being utilized to actuate a switch assembly, thereby indicating the occurrence of liquid flow. When gaseous flow enters the apparatus, the liquid head recedes, causing the tube assembly to move downward; thereby actuating the switch to its alternate position and indicating the occurrence of gaseous flow. The tube assembly is in the down position with either gaseous flow or no flow.

11 Claims, 6 Drawing Figures

3,958,092

APPARATUS FOR DISCRIMINATING BETWEEN LIQUID AND GASEOUS FLOW

BACKGROUND OF THE INVENTION

There are untold instances in the fluid flow field where it is desirable to discriminate between liquid and gaseous flow. This is particularly true in the production of hydrocarbons from oil wells where artificial lift is employed. Where the specific artificial lift apparatus is a rod pump, the downhole pump can usually lift fluid at a greater rate than the hydrocarbon bearing formation can release it into the wellbore. Therefore, the fluid level in the wellbore will decrease with each stroke of the pump, until the pump piston lifts clear of the fluid on the upstroke. Under this condition, as the pump piston descends on the downstroke, it will pound into the fluid, causing shock waves to be transmitted through the sucker rods to the surface equipment. This is called a "pump-off" condition and is injurious to the downhole pump, rod string, as well as the pump jack apparatus. An aggravated pump-off condition induces severe "fluid pounding."

When an oil well is "pumped-off," liquid flow decreases and gaseous flow increases. Accordingly, an effective pump-off control must incorporate a flow sensor which is capable of differentiating between a liquid and gaseous flow condition.

In my prior issured U.S. Pat. Nos. 3,551,071 and 3,551,620, there is taught a Flow, No-Flow device for discriminating between liquid and gaseous flow. Reference is made to these two previously issued patents as well as to the prior art cited therein for further background of the invention.

The present invention constitutes improvements over the prior art in that the addition of a manifold and a rearrangement of the porting associated with the movable valve element brings about unexpected results which greatly increases the utility of the prior art apparatus.

The present invention can be used to advantage in conjunction with wells operated by a computer control system by placing the apparatus of the invention in a flow line, and determining whether oil or gas is flowing therethrough. A remote alarm means can be actuated by the flow responsive apparatus to pin point the precise well which is off production.

SUMMARY OF THE INVENTION

A flow responsive apparatus for discriminating between liquid and gaseous flow which occurs therethrough. The apparatus comprises a main housing having an inlet spaced from the outlet and a valve seat interconnected therebetween. A valve element having a tube connected for movement therewith is received within the valve seat to control the flow of liquid therethrough.

A manifold is formed which has a first and second passageway, each being connected together at one end portion thereof, with one of the remaining ends being connected to receive flow from the valve element and the other remaining end connected to receive flow from the seat. The manifold and tube are arranged respective to one another and to the remaining structure so that the liquid head developed within the tube is also developed within the manifold.

This arrangement of elements provides apparatus which will move the valve element in an upward direction during liquid flow conditions, and when gas enters the apparatus, the liquid head recedes, and the tube assembly moves in a downward direction. Advantage is taken of the movement of the tube to actuate a sensor device.

Therefore, the primary object of the present invention is the provision of improvements in flow responsive apparatus for discriminating between liquid and gaseous flow therethrough.

Another object of the invention is to provide apparatus for sensing a pump-off condition in a downhole pump assembly.

A further object of this invention is to disclose and provide apparatus through which gaseous and liquid flow simultaneously occurs, with the gaseous flow being diverted along one flow passageway, while the liquid flow is diverted along another passageway.

A still further object of this invention is to provide apparatus for diverting gaseous and liquid flow along two different flow paths.

Another and still further object of the present invention is to provide apparatus for sensing the occurrence of liquid flow therethrough.

An additional object of the invention is to provide apparatus for sensing the occurrence of gaseous flow therethrough.

Another object of the invention is to provide apparatus for determining the quantity of a mixed flow of gaseous and liquid fluid which flows therethrough.

These and various other objects and advantages of the invention will become readily apparent to those skilled in the art upon reading the following detailed description and claims and by referring to the accompanying drawings.

The above objects are attained in accordance with the present invention by the provision of an apparatus fabricated in a manner substantially as described in the above abstract and summary.

DETAILED DESCRIPTION OF THE PREFERRED EMBODIMENT

Figure 1:
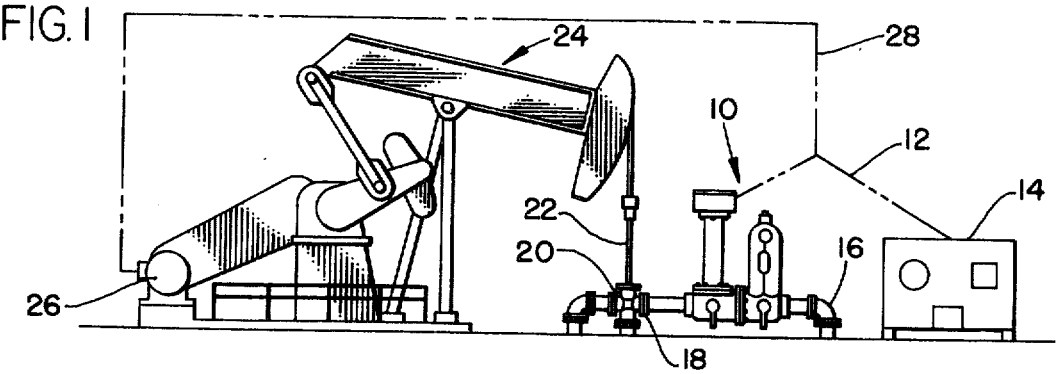
FIG. 1 is a part-schematical, part-diagrammatical illustration which sets forth one form of operation of the present invention.
Figure 2:
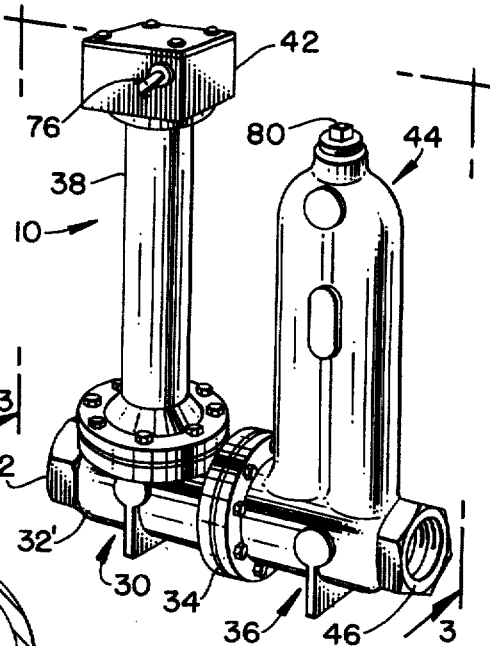
FIG. 2 is an enlarged, perspective view of part of the apparatus disclosed in FIG. 1, and made in accordance with the present invention.

In FIG. 1 there is diagrammatically disclosed the present invention 10 associated with artificial lift apparatus. Electrical conduit 12 is connected to a control device 14, which receives a signal from the invention. Outflow pipe 16 is connected to christmas tree 18 of the wellhead, so that production therefrom can be flow connected to a tank farm (not shown).

A string of sucker rod (not shown) is connected to a polished rod 22 and reciprocated by the pump jack apparatus 24. The pump jack apparatus is driven by the usual prime mover 26. Electrical conductor 28 is connected to the control device 14 which cyclically determines when the prime mover should be energized, thereby avoiding reaching a critical pump-off condition called "fluid pounding."

In FIGS. 2–5 there is disclosed one form of the flow phasor 10 made in accordance with the present invention. The apparatus is seen to have a main housing comprised of various sub-assemblies, including a valve body 30 having an inlet 32 in flow communication with an inlet chamber 33. Flange interface 34 is formed between a manifold body portion 36 and the valve body. The main housing further includes a riser column 38 removably bolted in overlying relationship respective to the valve body by means of flange 40. Control box 42 preferably is positioned at the upper extremity of the riser column where various electrical leads and conduits can be connected thereto. The upwardly extending manifold 44 is elevated a substantial amount above the outlet 46 of the main body, and below the upper extremity of the riser column.

Valve element 48 moves respective to a valve seat 50, to control the flow of fluid therethrough, through the liquid flow passageway 52, and to the outlet chamber 54. The valve element has a flow passageway 56 formed therein so that when the element is seated, gaseous fluid can only flow from the inlet passageway, into passageway 56, into entrance passageway 58 of the manifold, with the last passageway extending to a maximum height where it joins at 60 with an outlet passageway 59 of the manifold.

Tube assembly 62 is connected to move with the valve element and concentrically arranged respective to the riser column, thereby leaving an annular area 64 which is spaced from interior 66 of the hollow tube. The annulus is separated from the inlet chamber entrance passageway by means of an elastomeric member 68 which is connected to the valve element at 69 and to the flange 40 at 67 by using known techniques.

A sensor device, illustrated as being in the form of a magnetically actuated switch, is connected to measure or determine relative movement between the valve element and the main housing. The switch assembly comprises a magnet 70 connected to the tube and a magnetically actuated reed switch 72 connected to the control box. The box is supported by the riser column. The switch assembly includes sensitivity adjustment 74 and electrical connections 76 mounted to an electrical terminal block 78 so that suitable commercial electrical connections can be mechanically effected as may be deemed desirable. There is no seal between the interior of the tube and the annulus 64.

Clean-out plug 60 forms the upper extremity of the manifold, while spaced wall surfaces 82 and 84 form part of the entrance passageway thereof. Upper terminal end portion 86 of the common wall 84 joins together one end portion of the entrance and outlet passageways. Walls 87 and 88 form the outlet passageway.

OPERATION

Figure 6:
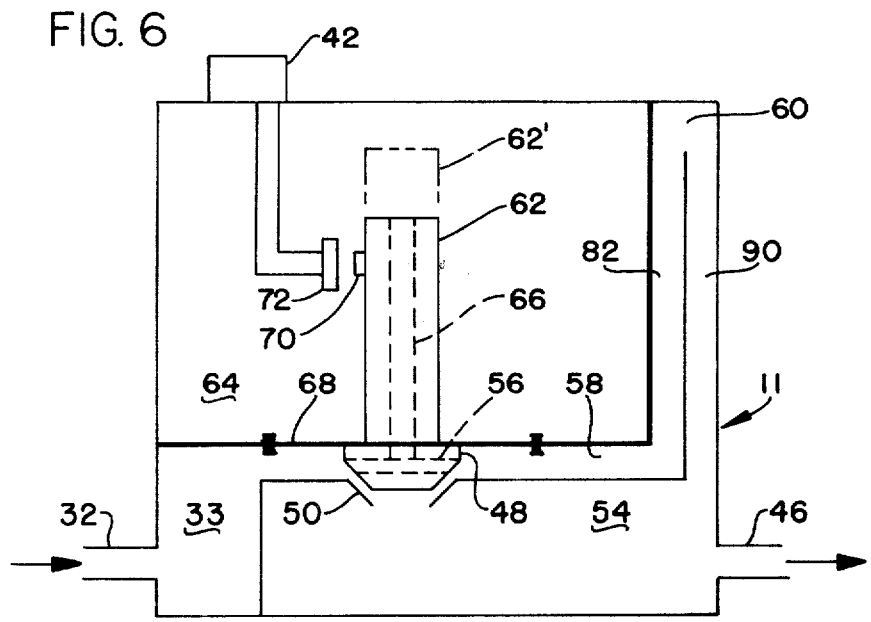
FIG. 6 is a part-diagrammatical, part-schematical, hypothetical representation of the present invention, which sets forth the theory of operation involved herein.

The operation of the apparatus disclosed in FIGS. 2–5 is best understood with reference to the part-diagrammatical, part-schematical hypothetical representation set forth in FIG. 6, wherein like or similar numerals therein refer to like or similar elements throughout the remaining figures of the drawings. As seen in FIG. 6, the flow responsive apparatus 10 is incorporated within a main housing 11 so that liquid and gaseous fluid flowing into inlet chamber 33 by means of inlet 32 is diverted, thereby causing liquid to flow through the valve seat 50, while gas flows along the two co-extensive or parallel passageways of the manifold, to where the liquid and gas is again admixed within the outlet chamber and flows through outlet 46.

Tube 62 is connected to and moves with the valve element 48, as indicated by the dot-dash numeral 62'. As the valve element 56 raises a predetermined distance from its seat, magnet 70 comes into close proximity to and actuates magnetically actuated switch 72, thereby providing control box 42 with a signal which provides information and which can accordingly be transmitted to a controlling device and treated in any number of different ways.

Assuming that gaseous flow enters the inlet chamber of the main housing, the gaseous flow will continue through passageway 56 formed in the valve element, through inlet 58 of the entrance passageway of the manifold, up the vertical passageway of the manifold, where the flow joins the discharge passageway 90 at 60 and continues down the vertical passageway into outlet chamber 54 and through outlet 46. During this time, tube 62 is in a lowermost position so that the magnetically actuated switch is in one of its alternate positions, which preferably is open circuit. The apparatus remains in this configuration so long as gaseous flow occurs through the device.

Figure 3:
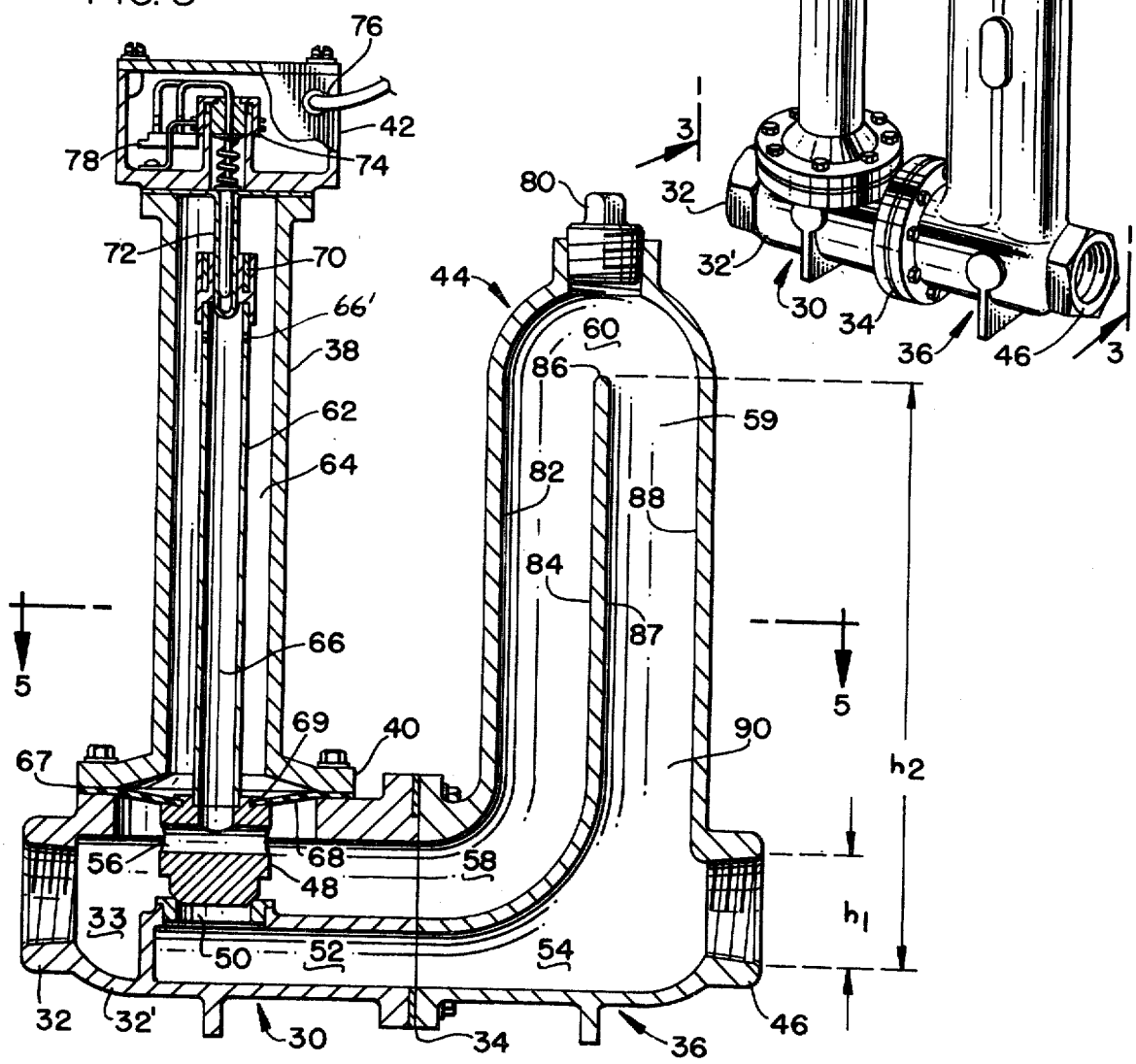
FIG. 3 is a longitudinal, cross-sectional view of the apparatus disclosed in FIG. 2.
Figure 4:
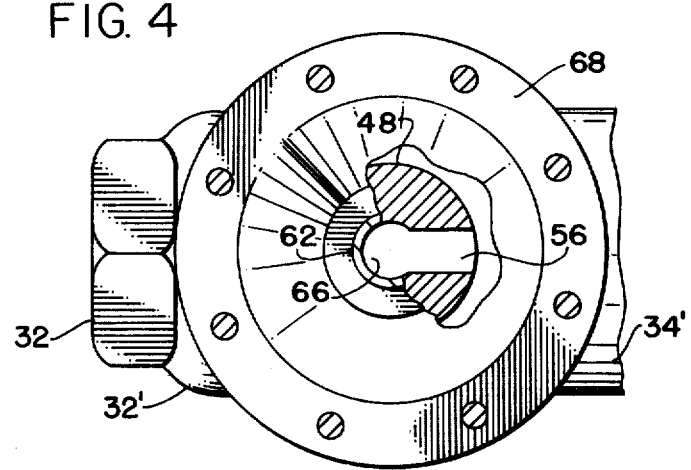
FIG. 4 is an enlarged, broken, top-plan view of part of the apparatus disclosed in FIG. 3, with some parts thereof being broken away therefrom and the remaining parts being shown in cross-section.
Figure 5:
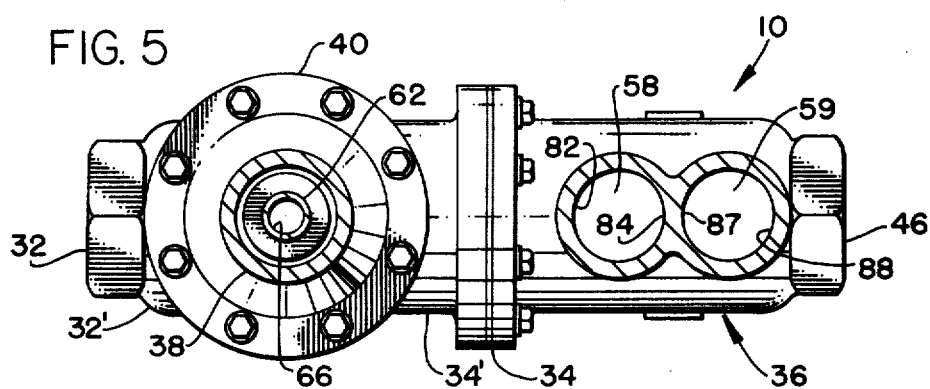
FIG. 5 is a cross-sectional view taken along 5—5 of FIG. 3.

As mixed flow, that is, liquid and gas, enters chamber 33, the liquid level will rise within the passageway 58 until it reaches some value between $h_1$ and $h_2$ as seen indicated in FIG. 3. The liquid head effected within the entrance passageway of the manifold will also be effected within the tube, and the hydrostatic head will be effected against the underside or lower face of diaphragm assembly 68. Since the diaphragm maintains annular chamber 64 separated from the inlet chamber, the height of the hydrostatic head determines the amount that the valve element is lifted from its seat. As the valve element lifts from the seat, liquid flows through seat 50 and into the discharge chamber 54 where the flow continues through the outlet 46.

As low volumn mixed gas and liquid flow occurs, a small percentage of the gas will therefore flow through the seat 50 along with the liquid, while most of the gas will escape through the manifold.

Accordingly, a throttling action occurs between the valve element and its seat, with the amount of clearance therebetween being proportional to the head effected within the manifold. The mass flow rates of gas and liquid through the apparatus should be considered in selecting the size of the valve, the seat, and the height of the tube and the manifold. It is preferred that the tube be disposed at an elevation which locates the free end thereof slightly above the common end 60 of the manifold so that separation is effected between the annulus and the interior of the tube, thereby obviating any danger of fluid accumulating within the annulus 64 of FIG. 3.

The present invention can be utilized to monitor the oil/gas ratio or liquid/gas ratio of flow through any flow line. The apparatus can be used to advantage as a pump-off control in illustrated manner of FIG. 1 by utilizing the signal at 42 to actuate a controlling device 14. The controlling device 14 has a time clock which cyclically energizes the prime mover 26, and after a finite lapse of time which is based on the history of the production reservoir, de-energizes the prime mover. The well remains shut-in until a second time delay period during which the downhole reservoir replenishes the fluid contained within the borehole so that when the pumping action is resumed, the downhole pump will be lifting liquid rather than liquid and gaseous mixtures, which causes fluid pounding.

At any time during any of the pumping cycles, should a pump-off condition be encountered, and before appreciable fluid pounding occurs, the prime mover is de-energized by the control of 14 until a suitable time period has elapsed.

I claim:

1. Flow responsive apparatus for discriminating between liquid and gaseous flow therethrough, comprising a main housing having an inlet chamber and an outlet chamber formed therewithin; means forming a flow passageway into said inlet chamber, a valve seat, means by which said valve seat is interposed between said inlet chamber and said outlet chamber to enable flow to occur therebetween;

a riser column affixed to said housing; a tube having opposed ends, means mounting said tube for movement within said riser column such that an annulus is formed therebetween; a valve element affixed to one end of said tube; means mounting said valve element within said housing at a location which controls flow through said valve seat in response to said valve element being moved respective to said seat; means forming a flow passageway from said inlet chamber, through said valve element, through at least part of said tube, and into said annulus;

seal means interposed between said valve element and said riser column such that direct flow is precluded between said inlet chamber and said annulus;

a manifold divided into an entrance and a discharge passageway, means by which one end of said discharge passageway is flow connected to said outlet chamber, means by which one end of said entrance passageway is flow connected to said flow passageway in said valve element; means by which the remaining ends of said entrance and discharge passageways are flow connected to one another;

means mounting said manifold respective to said tube and said valve seat such that a liquid column effected within said entrance passageway is also effected within said tube, thereby causing said valve element to move respective to said seat so that liquid flow occurs through said valve seat;

and a sensor means for sensing relative movement between said valve element and said valve seat.

2. The apparatus of claim 1 wherein said tube is vertically disposed, and said entrance and discharge passageways are co-extensive with one another; and the ends of said entrance and discharge passageways which are flow connected to one another are elevated to a position which is substantially vertically disposed below the passageway which connects the annulus to the tube.

3. The apparatus of claim 1 wherein the end of said tube which is opposed to said valve element is a marginal free end which reciprocates in spaced relation respective to said riser column;

means mounting said sensor means respective to said tube and said riser column such that relative movement therebetween is sensed by said sensor means.

4. The apparatus of claim 3 wherein said tube is moved in a first direction in response to a large flow of liquid occurring through said valve seat, said tube is moved in a second direction in response to a small flow of liquid occurring through said valve seat; said sensor means is a switch having electrical contacts which are moved from a conducting configuration into a non-conducting configuration in response to movement of said tube from said first direction to said second direction, and vice versa.

5. Apparatus for discriminating between gaseous and liquid flow comprising means forming an inlet chamber, an outlet chamber, and a valve seat;

means by which said inlet and outlet chambers are separated from one another and flow connected together by said valve seat;

a valve element, means mounting said valve element respective to said valve seat such that movement of said valve element respective to said valve seat determines the magnitude of the flow of fluid which can occur from said inlet chamber, through said valve seat, and into said outlet chamber;

means forming a flow passageway through said valve element; a manifold having an entrance and a discharge flow passageway formed therewithin, said discharge passageway having opposed ends with one end thereof being connected to said outlet chamber, said entrance passageway having opposed ends with one end thereof being connected to said passageway in said valve element; the remaining ends of said entrance and discharge passageways being connected to one another;

a hollow tube connected to said valve element, means by which the interior of said tube is flow connected to said flow passageway formed in said valve element; a tube receiving riser column within which a marginal end portion of said tube is reciprocatingly received; the exterior of said tube and the interior of said riser column being spaced apart to form an annulus therebetween;

seal means forming part of said inlet chamber for separating said annulus from said inlet chamber;

means by which said entrance flow passageway is positioned respective to said tube to cause a liquid head effected within said entrance passageway to also be effected within said tube.

6. The apparatus of claim 5 wherein said entrance and discharge passageways are co-extensive with one another and the joined together end portions thereof are elevated to a position which is substantially vertically disposed below the maximum height of said tube.

7. The apparatus of claim 5 wherein said riser column is concentrically arranged respective to said valve seat and said tube;

a switch means; means mounting said switch means respective to said riser column and said tube such that relative movement between said tube and said riser column causes said switch means to be actuated.

8. The apparatus of claim 5 wherein said seal means and said valve element jointly form a wall surface of said inlet chamber;

means forming a flow passageway by which the end of said tube which is opposite to said valve element is placed in communication with said annulus;

the ratio of the area of said wall surface, said annulus, and said tube is of a value which causes said valve element to be displaced from its seat when liquid rises within said entrance passageway; and, sensor means responsive to movement of said tube respective to said valve seat for indicating the occurrence of liquid flow.

9. The apparatus of claim 5 and further including means forming a passageway by which the end of said tube which is opposed to said valve element is placed in communication with said annulus;

means extending said entrance passageway to an elevation which is below said passageway formed at the end of said tube;

said seal means and said valve element forming a wall surface of said inlet passageway;

means, including the weight of said valve element and tube, by which said valve element is forced toward said seat when only gas is flowing into said inlet chamber;

the ratio of the area of said wall surface respective to the cross-sectional area of said tube is of a value whereby the valve element moves away from said seat when liquid flows from said inlet chamber and through said valve element to establish a hydrostatic head in said tube and said entrance passageway.

10. The combination with a subsurface pump assembly for lifting fluid from the bottom of a borehole to the surface of the ground, and a control means for controlling the action of the pump, of a pump-off control apparatus, comprising: a main housing having means forming an inlet chamber and an outlet chamber therewithin; a manifold having an inlet and an outlet; a riser column connected to said inlet chamber; a valve element; a valve seat; a tube assembly having one end thereof connected to said valve element; and a sensor means for sensing movement of said valve element;

means mounting said valve element respective to said valve seat to control flow therethrough; means positioning said valve seat between said inlet and outlet chambers so that liquid can flow from said inlet chamber, through said valve seat, and into said outlet chamber; means forming a passageway through said valve element for connecting said inlet of said manifold to said inlet chamber, means connecting the outlet of said manifold to said outlet chamber; means connecting the interior of said tube to said passageway which is formed through said valve element;

said manifold having means forming a liquid trap therein so that a hydrostatic head can be developed within said tube when the manifold is located at an elevation which is above said valve element; a marginal end portion of said tube is reciprocatingly received within said riser column to form an annulus therebetween; seal means located respective to said tube, riser column, and inlet chamber to prevent flow directly from said inlet chamber into said annulus; means forming a flow passageway between the interior of said tube and said annulus;

said control means cyclically energizes said pump so that it produces fluid for a first time period and thereafter is de-energized for a second time period; and, means by which said sensor means causes said control means to de-energize said pump whenever movement of said valve element indicates that liquid flow has diminished and that a pump-off condition has therefore been encountered by the subsurface pump.

11. The combination of claim 10 wherein said liquid trap is comprised of two vertically disposed passageways having two ends thereof joined together and elevated above said valve element, while one remaining end thereof is flow connected to said passageway in said valve element and the other remaining end thereof is flow connected to said outlet chamber.

* * * * *